United States Patent
Ording et al.

(10) Patent No.: US 7,856,605 B2
(45) Date of Patent: Dec. 21, 2010

(54) METHOD, SYSTEM, AND GRAPHICAL USER INTERFACE FOR POSITIONING AN INSERTION MARKER IN A TOUCH SCREEN DISPLAY

(75) Inventors: Bas Ording, San Francisco, CA (US);
Marcel Van Os, San Francisco, CA (US); Kenneth Kocienda, Sunnyvale, CA (US); Richard Williamson, Los Gatos, CA (US); Scott Forstall, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 11/553,436

(22) Filed: Oct. 26, 2006

(65) Prior Publication Data

US 2008/0259040 A1 Oct. 23, 2008

(51) Int. Cl.
*G06F 3/048* (2006.01)
(52) U.S. Cl. ............... 715/856; 715/711; 715/857; 715/858; 345/173
(58) Field of Classification Search ........... 715/711, 715/856–859, 862; 345/156, 173
See application file for complete search history.

(56) References Cited

U.S. PATENT DOCUMENTS

| | | | |
|---|---|---|---|
| 5,319,386 A | 6/1994 | Gunn et al. | 345/173 |
| 5,589,856 A | 12/1996 | Stein et al. | 345/173 |
| 5,736,974 A | 4/1998 | Selker | 345/146 |
| 5,910,800 A | 6/1999 | Shields et al. | 345/336 |
| 6,037,939 A | 3/2000 | Kashiwagi et al. | 345/342 |
| 6,049,326 A | 4/2000 | Beyda et al. | 345/157 |
| 6,073,036 A | 6/2000 | Heikkinen et al. | 455/575 |
| 6,411,283 B1 * | 6/2002 | Murphy | 345/173 |
| 6,664,989 B1 * | 12/2003 | Snyder et al. | 715/856 |
| 7,075,512 B1 | 7/2006 | Fabre et al. | 345/156 |
| 2001/0040587 A1 * | 11/2001 | Scheck | 345/676 |
| 2002/0067346 A1 * | 6/2002 | Mouton | 345/173 |

(Continued)

FOREIGN PATENT DOCUMENTS

EP 0 795 811 A1 9/1997

(Continued)

OTHER PUBLICATIONS

International Search Report and Written Opinion for International Application PCT/US2007/077645, mailed Jan. 10, 2008. (Related case).

(Continued)

*Primary Examiner*—Dennis-Doon Chow
*Assistant Examiner*—Shen Shiau
(74) *Attorney, Agent, or Firm*—Morgan, Lewis & Bockius LLP

(57) ABSTRACT

An insertion marker that is displayed on a touch screen may be moved by a user via an insertion marker placement aid. The insertion marker placement aid is displayed on the touch screen after a contact with the touch screen is detected. The insertion marker placement aid provides visual feedback to the user, indicating that the insertion marker is subject to repositioning by the user. When the contact is moved across the touch screen, the insertion marker and the insertion marker placement aid is moved in accordance with the movement of the contact. When the contact is broken (i.e., no longer detected), the insertion marker placement aid is removed from display and the insertion marker comes to rest.

33 Claims, 12 Drawing Sheets

U.S. PATENT DOCUMENTS

| | | | |
|---|---|---|---|
| 2002/0080123 A1 | 6/2002 | Kennedy et al. | 345/173 |
| 2002/0180763 A1 | 12/2002 | Kung | 345/660 |
| 2003/0063073 A1 | 4/2003 | Geaghan et al. | 345/173 |
| 2004/0135818 A1 | 7/2004 | Thomson et al. | 345/823 |
| 2004/0155888 A1 | 8/2004 | Padgitt et al. | 345/619 |
| 2004/0160419 A1 | 8/2004 | Padgitt | 345/173 |
| 2004/0196267 A1 | 10/2004 | Kawai et al. | 345/173 |
| 2005/0024341 A1 | 2/2005 | Gillespie et al. | 345/173 |
| 2005/0093826 A1* | 5/2005 | Huh | 345/168 |
| 2005/0190147 A1* | 9/2005 | Kim | 345/156 |
| 2006/0001654 A1 | 1/2006 | Smits | 345/176 |
| 2006/0022955 A1 | 2/2006 | Kennedy | 345/173 |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0097991 A1 | 5/2006 | Hotelling et al. | 345/173 |
| 2006/0132460 A1* | 6/2006 | Kolmykov-Zotov et al. | 345/173 |
| 2006/0274051 A1 | 12/2006 | Longe et al. | 345/173 |
| 2007/0139374 A1* | 6/2007 | Harley | 345/157 |
| 2009/0225100 A1 | 9/2009 | Lee et al. | 345/660 |
| 2009/0228841 A1 | 9/2009 | Hildreth | 715/863 |

FOREIGN PATENT DOCUMENTS

| | | | |
|---|---|---|---|
| EP | 1674976 A2 | 6/2006 | |
| GB | 2351639 A | 1/2001 | |
| WO | WO 00/75766 A1 | 12/2000 | |
| WO | WO 01/46790 A2 | 6/2001 | |
| WO | WO 2004/051392 A2 | 6/2004 | |
| WO | WO 2006/020304 A2 | 2/2006 | |
| WO | WO 2006/020305 | 2/2006 | |

OTHER PUBLICATIONS

Office Action dated May 5, 2008, for U.S. Appl. No. 10/927,925.

International Search Report and Written Opinion for International Application No. PCT/US2007/082486, mailed Jul. 18, 2008.

Miller, D., "Personal/Java Application Environment," Jun. 8, 1999, 12 pages http://java.sun.com/products/personaljava/touchable/.

Rekimoto, J. et al., "PreSense: Interaction Techniques for Finger Sensing Input Devices," UIST 2003, Vancouver, BC, Canada, © 2003 ACM, vol. 5, Issue 2, pp. 203-212.

Final Office Action dated Nov. 17, 2009, received in U.S. Appl. No. 10/927,925.

Lee et al., "A Multi-Touch Three Dimensional Touch-Sensitive Tablet," CHI 85 Proceedings, Apr. 1985, pp. 21-25.

* cited by examiner

METHOD, SYSTEM, AND GRAPHICAL USER INTERFACE FOR POSITIONING AN INSERTION MARKER IN A TOUCH SCREEN DISPLAY

TECHNICAL FIELD

The disclosed embodiments relate generally to user interfaces, and more particularly, to a method, system, and user interface for positioning an insertion marker in a touch-sensitive display.

BACKGROUND

As portable electronic devices become more compact, and the amount of information to be processed and stored increases, it has become a significant challenge to design a user interface that allows users to easily interact with the device. This is unfortunate because the user interface is the gateway through which users receive not only content but also responses to user actions or behaviors, including user attempts to access a device's features or tools. Some portable electronic devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user. In addition, as the number of pushbuttons has increased, the proximity of neighboring buttons often makes it difficult for users to activate a desired pushbutton.

Some portable devices now have user interfaces based on a touch-sensitive display (also known as a "touch screen"). The user interacts with a graphical user interface via the touch-sensitive display. The user may operate the interface with a stylus or a digit. Operating a user interface on a touch-sensitive display with a digit (e.g., a finger), however, poses some problems. Because of the relatively small screen sizes on the portable devices, a digit making contact with the touch screen can obscure a sizable portion of the screen and whatever information that is displayed in the obscured portion. Furthermore, operating the interface with a digit may be less precise, because the contact area of a digit with the touch-sensitive display is typically larger than the contact area of a pointed object such as a stylus. This precision problem is particularly acute in text entry applications, where imprecise positioning of the cursor or character insertion marker can make text entry inefficient and frustrate users.

Accordingly, there is need for more efficient ways to position an insertion marker in a touch sensitive display.

SUMMARY

The above deficiencies and other problems associated with user interfaces for portable devices are reduced or eliminated by the disclosed device that includes an insertion marker placement aid.

According to some embodiments, a computer-implemented method includes, at a portable electronic device with a touch screen display, displaying an insertion marker in the touch screen display; detecting a finger contact with the touch screen display; in response to the detected finger contact, displaying an insertion marker placement aid in the touch screen display; detecting movement of the finger contact; and moving the insertion marker and the insertion marker placement aid in accordance with the detected movement of the finger contact.

According to some embodiments, a graphical user interface on a portable electronic device with a touch screen display includes an insertion marker and an insertion marker placement aid, wherein the insertion marker and the insertion marker placement aid move in the touch screen display in accordance with the detected movement of a finger that contacts the touch screen display.

According to some embodiments, a portable electronic device includes a touch screen display, one or more processors, memory, and one or more programs, wherein the one or more programs are stored in the memory and configured to be executed by the one or more processors. The one or more programs include instructions for displaying an insertion marker in the touch screen display; instructions for detecting a finger contact with the touch screen display; instructions for responding to the detected finger contact by displaying an insertion marker placement aid in the touch screen display; instructions for detecting movement of the finger contact; and instructions for moving the insertion marker and the insertion marker placement aid in accordance with the detected movement of the finger contact.

According to some embodiments, a computer-program product includes a computer readable storage medium and a computer program mechanism embedded therein. The computer program mechanism includes instructions which, when executed by a portable electronic device with a touch screen display, cause the device to display an insertion marker in the touch screen display; to detect a finger contact with the touch screen display; in response to the detected finger contact, to display an insertion marker placement aid in the touch screen display; to detect movement of the finger contact; and to move the insertion marker and the insertion marker placement aid in accordance with the detected movement of the finger contact.

According to some embodiments, a portable electronic device with a touch screen display includes means for displaying an insertion marker in the touch screen display; means for detecting a finger contact with the touch screen display; in response to the detected finger contact, means for displaying an insertion marker placement aid in the touch screen display; means for detecting movement of the finger contact; and means for moving the insertion marker and the insertion marker placement aid in accordance with the detected movement of the finger contact.

According to some embodiments, a computer-implemented method includes, at a portable electronic device with a touch screen display, displaying an insertion marker in the touch screen display; detecting a finger contact with the touch screen display; in response to the detected finger contact, modifying the appearance of the insertion marker in the touch screen display; detecting movement of the finger contact; and moving the modified insertion marker in accordance with the detected movement of the finger contact.

According to some embodiments, a graphical user interface on a portable electronic device with a touch screen display includes an insertion marker wherein, in response to detection of a finger contact with the touch screen display, the appearance of the insertion marker is modified and the modified insertion marker is moved in accordance with detected movement of the finger contact.

According to some embodiments, a portable electronic device includes a touch screen display, one or more processors, memory, and at least one program, wherein the at least one program is stored in the memory and configured to be executed by the one or more processors. The at least one program includes instructions for displaying an insertion marker in the touch screen display; instructions for detecting a finger contact with the touch screen display; instructions for, in response to the detected finger contact, modifying the appearance of the insertion marker in the touch screen display; instructions for detecting movement of the finger contact; and instructions for moving the modified insertion marker in accordance with the detected movement of the finger contact.

According to some embodiments, a computer-program product includes a computer readable storage medium and a computer program mechanism embedded therein. The computer program mechanism includes instructions which, when executed by a portable electronic device with a touch screen display, cause the device to display an insertion marker in the touch screen display; detect a finger contact with the touch screen display; in response to the detected finger contact, modify the appearance of the insertion marker in the touch screen display; detect movement of the finger contact; and move the modified insertion marker in accordance with the detected movement of the finger contact.

According to some embodiments, a portable electronic device with a touch screen display includes means for displaying an insertion marker in the touch screen display; means for detecting a finger contact with the touch screen display; in response to the detected finger contact, means for modifying the appearance of the insertion marker in the touch screen display; means for detecting movement of the finger contact; and means for moving the modified insertion marker in accordance with the detected movement of the finger contact.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
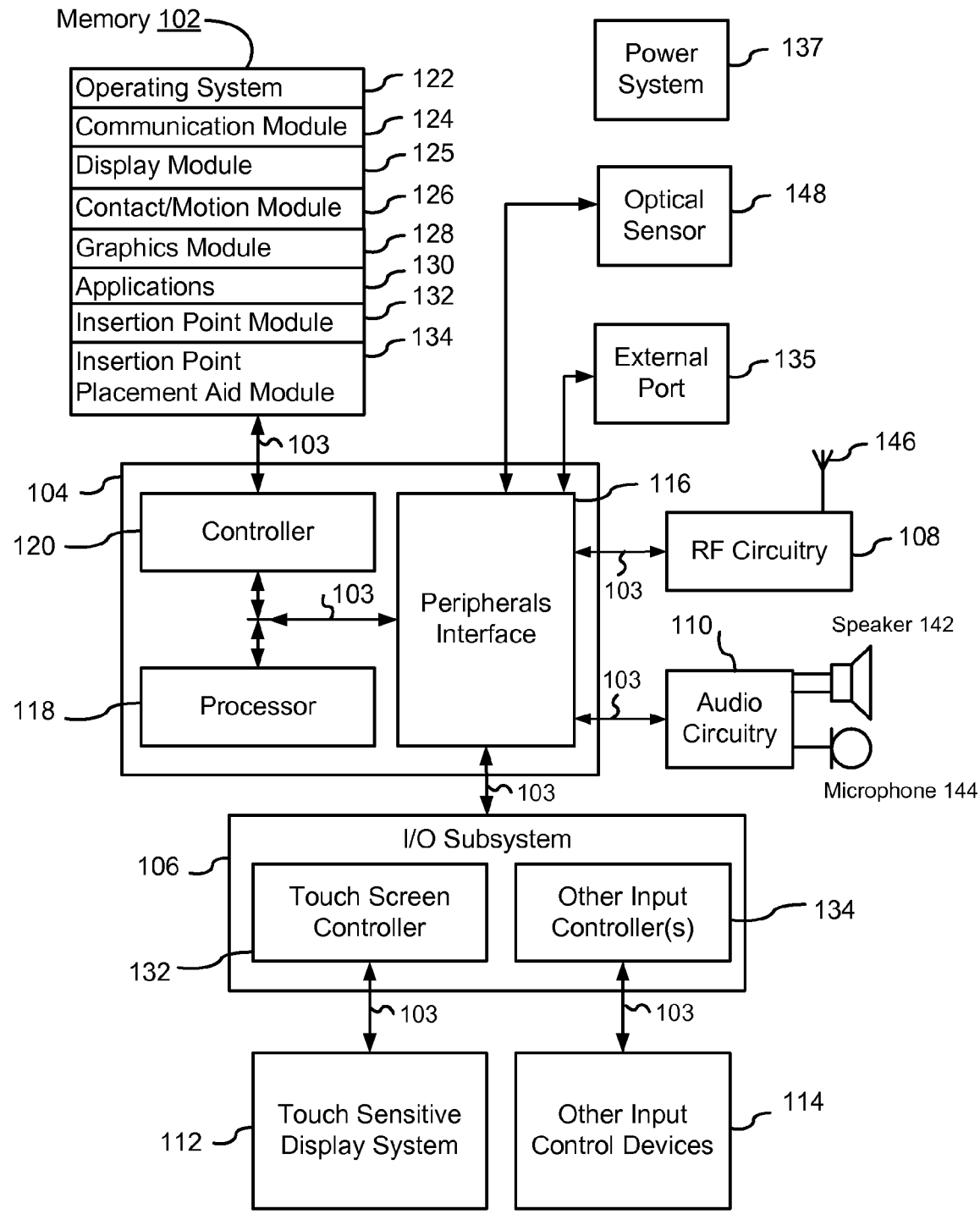
FIG. 1 is a block diagram illustrating a portable electronic device in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of user interfaces and associated processes for using a portable electronic device are described. In some embodiments, the device is a portable communications device such as a mobile telephone. The user interface may include a click wheel in addition to a touch screen. A click wheel is a physical user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel. For simplicity, in the discussion that follows, a portable communications device (e.g., a cellular telephone that may also contain other functions, such as SMS, PDA and/or music player functions) that includes a touch screen is used as an exemplary embodiment. It should be understood, however, that the user interfaces and associated processes may be applied to other devices, such as personal computers and laptops, which may include one or more other physical user-interface devices, such as a click wheel, a keyboard, a mouse and/or a joystick.

The various applications that may be executed on the device may use at least one common physical user-interface device, such as the touch screen. In embodiments that include a click wheel, one or more functions of the click wheel as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more keyboard embodiments. The keyboard embodiments may include standard (QWERTY) and/or non-standard configurations of symbols on the displayed icons of the keyboard. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the keyboard embodiments.

Attention is now directed to an embodiment of a portable electronic device. FIG. 1 is a block diagram illustrating an embodiment of a portable electronic device 100 having a touch-sensitive display 112. The touch-sensitive display 112 is sometimes called a "touch screen" for convenience. The device 100 may include a memory controller 120, one or more data processors, image processors and/or central processing units 118 and a peripherals interface 116. The memory controller 120, the one or more processors 118 and/or the peripherals interface 116 may be separate components or may be integrated, such as in one or more integrated circuits 104. The various components in the device 100 may be coupled by one or more communication buses or signal lines 103.

If the device 110 includes picture taking capabilities, the peripherals interface 116 is coupled to an optical sensor 148, such as a CMOS or CCD image sensor. The peripherals interface 116 is also coupled RF circuitry 108; audio circuitry 110; and/or an input/output (I/O) subsystem 106. The audio circuitry 110 may be coupled to a speaker 142 and a microphone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a mobile phone (e.g., a cellular telephone).

The I/O subsystem 106 includes a touch screen controller 132 and/or other input controller(s) 134. The touch-screen controller 132 is coupled to a touch-sensitive screen or touch sensitive display system 112. The touch screen 112 and touch screen controller 132 may detect contact and any movement or break thereof using any of a plurality of touch sensitivity technologies now known or later developed, including but not limited to capacitive, resistive, infrared, and surface acoustic wave technologies, as well as other proximity sensor arrays or other elements for determining one or more points of contact with the touch-sensitive screen 112. The touch-sensitive screen 112 may have a resolution in excess of 100 dpi. In an exemplary embodiment, the touch-sensitive screen 112 has a resolution of approximately 168 dpi. The other input controller(s) 134 may be coupled to other input/control devices 114, such as one or more buttons. In some alternate embodiments, input controller(s) 134 may be coupled to any (or none) of the following: a keyboard, infrared port, USB port, and/or a pointer device such as a mouse. The one or more buttons (not shown) may include an up/down button for volume control of the speaker 142 and/or the microphone 144. The one or more buttons (not shown) may include a push button. A quick press of the push button (not shown) may disengage a lock of the touch screen 112. A longer press of the push button (not shown) may turn power to the device 100 on or off. The user may be able to customize a functionality of one or more of the buttons. The touch screen 112 is used to implement virtual or soft buttons and/or one or more keyboards.

In some embodiments, the device 100 may include circuitry for supporting a location determining capability, such as that provided by the Global Positioning System (GPS). In some embodiments, the device 100 may be used to play back recorded music, such as one or more files, such as MP3 files or AAC files. In some embodiments, the device 100 may include the functionality of an MP3 player, such as an iPod (trademark of Apple Computer, Inc.). In some embodiments, the device 100 may include a multi-pin (e.g., 30-pin) connector that is compatible with the iPod.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

Memory controller 120 may be coupled to memory 102 with one or more types of computer readable medium. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. The memory 102 may include a display module (or a set of instructions) 125, a contact/motion module (or a set of instructions) 126 to determine one or more points of contact and/or their movement, and a graphics module (or a set of instructions) 128. The graphics module 128 may support "widgets," that is, modules or applications with embedded graphics. The widgets may be implemented using JavaScript, HTML, Adobe Flash, or other suitable computer program languages.

Memory 102 may also include one or more applications 130. Examples of applications that may be stored in memory 102 include email applications, text messaging or instant messaging applications, web browsers, memo pad applications, address books or contact lists, calendars, picture taking and management applications, and music playing and management applications.

Also in memory 102 are an insertion marker module (or set of instructions) 132 and an insertion marker placement aid module (or set of instructions) 134. The insertion marker module and insertion marker placement aid module includes instructions for controlling various aspects, such as movement, display style, and so forth, of the insertion marker and the insertion marker placement aid, respectively. An insertion marker is a visual object that is displayed on the touch screen to indicate the location where a character entered by the user will be inserted. The insertion marker may also be described as a cursor, insertion point, insertion bar, or pointer. As used in the specification and claims, the insertion marker placement aid is a visual object, separate from the insertion marker, that helps provides visual feedback to the user with regard to control and position of an insertion marker in response to contact(s) with the touch screen by the user's finger. Further details regarding the insertion marker and the insertion marker placement aid are described below.

Each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
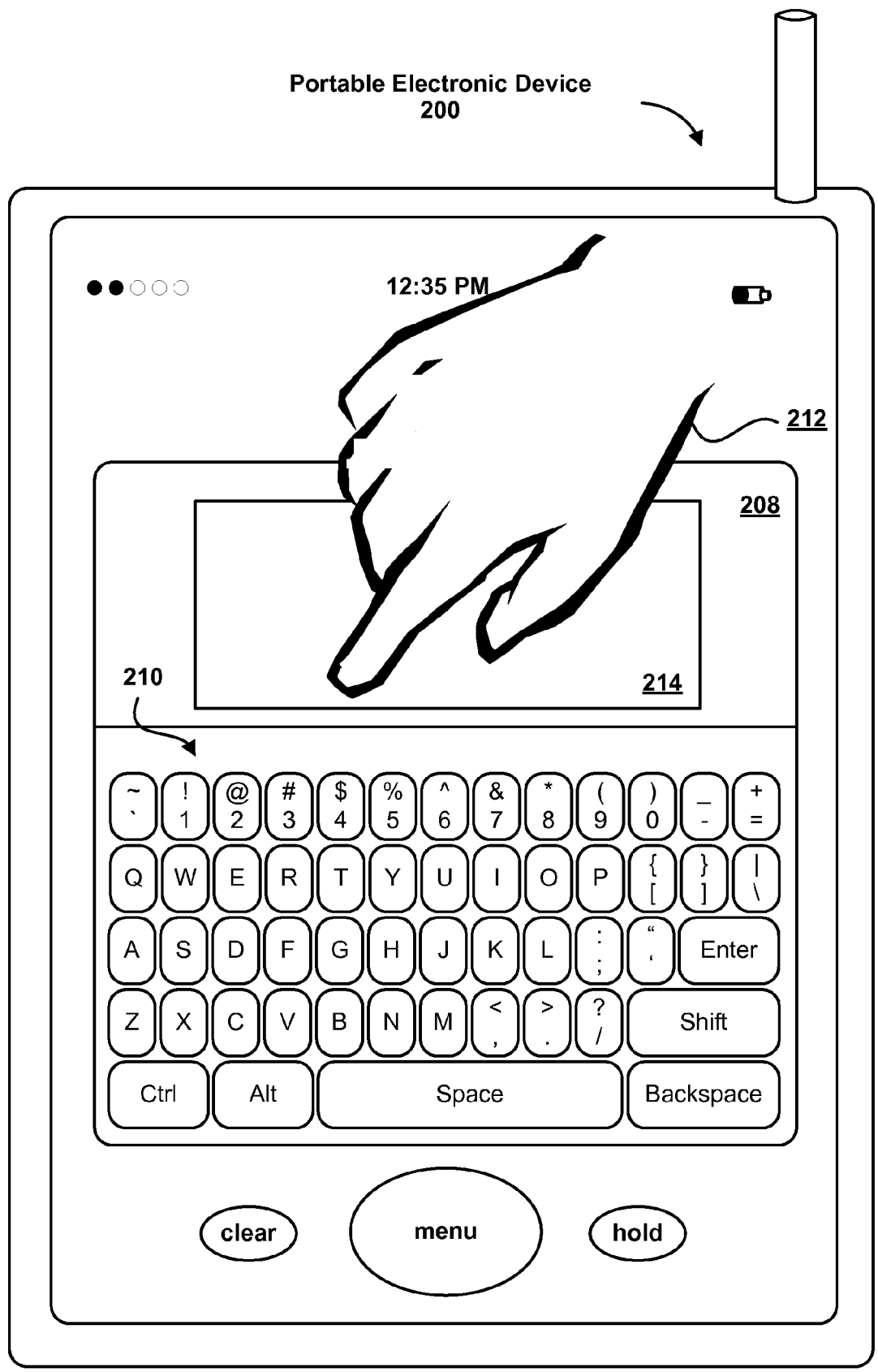
FIG. 2 illustrates a portable electronic device having a touch screen and a soft keyboard in accordance with some embodiments.

Attention is now directed towards embodiments of user interfaces and associated processes that may be implemented on the device 100. FIG. 2 is a schematic diagram illustrating an embodiment of a user interface for a portable electronic device 200. The device 200 includes a touch screen 208. The touch screen may display one or more trays. A tray is a predefined region within a graphical user interface. One tray may include a user entry interface, such as a keyboard 210 that includes a plurality of icons. The icons may include one or more symbols. In this embodiment, as well as others described below, a user may select one or more of the icons, and thus, one or more of the corresponding symbols, by making contact or touching the keyboard 210, for example, with one or more fingers 212 (not drawn to scale in the figure). The contact may correspond to the one or more icons. In some embodiments, selection of an icon occurs when the user breaks contact with the icon. In some embodiments, the contact may include a gesture, such as one or more taps, one or more swipes (from left to right, right to left, upward and/or downward) and/or a rolling of a finger (from right to left, left to right, upward and/or downward) that has made contact with the device 200. In some embodiments, inadvertent contact with an icon may not select a corresponding symbol. For example, a swipe gesture with an icon may not select a corresponding symbol when the gesture corresponding to selection is a tap.

The device 200 may include a display tray 214. The display tray 214 may display one or more of the characters and/or symbols that are selected by the user. The device 200 may also include one or more physical buttons, such as the clear, hold and menu buttons shown in FIG. The menu button may be used to navigate to any application in a set of applications that may be executed on the device 200. Alternatively, in some embodiments, the clear, hold, and/or menu buttons are implemented as soft keys in a GUI in touch screen 208.

Figure 3:
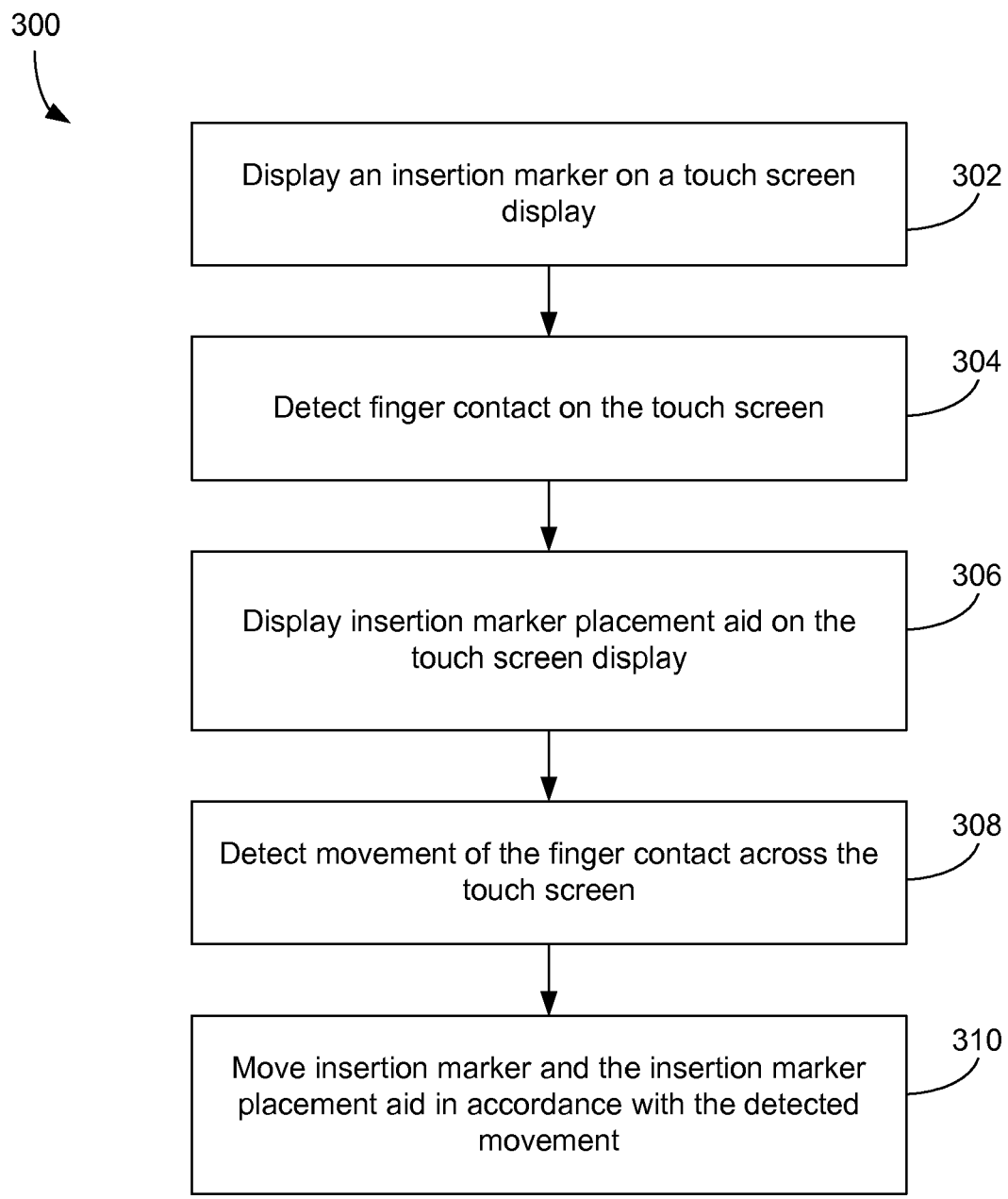
FIG. 3 is a flow diagram illustrating a process for positioning an insertion marker via an insertion marker placement aid in accordance with some embodiments.

Attention is now directed toward FIG. 3, which illustrates a process flow 300 for positioning an insertion marker via an insertion marker placement aid in accordance with some embodiments. An insertion marker is displayed on a touch screen (302). The insertion marker may be displayed in an application that includes text entry, such as a memo pad, email, or short message service (SMS) application. In some embodiments, the insertion marker is displayed in a first area (for example, display tray 214) that also includes text entered by the user via a keyboard (for example, keyboard 210) that is located in a second area. A contact on the touch screen, formed by a finger, is detected (304). The finger contact forms a contact area on the touch screen. In some embodiments, the contact area is not visually displayed to the user. An insertion marker placement aid is displayed on the touch screen (306). In some embodiments, the insertion marker placement aid is not displayed if the detected finger contact is initially in the display area containing the keyboard 210; such contact is interpreted as an attempt to hit a key on the keyboard 210 rather than an attempt to position the insertion marker. In some embodiments, the insertion marker placement aid is displayed if the detected finger contact is initially in an inputted text area (for example, display tray 214), even if the same finger contact is later in the display area containing the keyboard 210; such contact is interpreted as an attempt to position the insertion marker along the bottom of the inputted text area.

A movement of the finger across the touch screen is detected (308). In response to the detected movement, the insertion marker and the insertion marker placement aid is moved in accordance with the detected movement (310). Both the insertion marker and the insertion marker placement aid are moved in the general direction of the detected movement. For example, if the detected movement is rightward, the insertion marker and the insertion marker placement aid are moved rightward. In some embodiments, the movement of the insertion marker and the insertion marker placement aid is confined to the first area, where user-entered text is displayed. That first area may be the display tray 214.

The insertion marker and the insertion marker placement aid moves in accordance with any movement of the finger across the touch screen as long as the finger contact on the touch screen remains unbroken from when the finger contact on the touch screen is detected in block 304. If the contact with the touch screen is broken (and thus the contact with the touch screen is no longer detected), the insertion marker placement aid is removed from display and the insertion marker remains at its last position. In some embodiments, the insertion marker placement aid is removed from display after a predetermined time (e.g., a time in the range 0.25-5.0 seconds) has elapsed after the finger contact is broken and during which contact is not reestablished. Additionally, in some embodiments, when the insertion marker placement aid is removed from display, the insertion marker placement aid is faded out.

Attention is now directed toward FIGS. 4A-4F, which illustrate a user interface for positioning an insertion marker via an insertion marker placement aid in accordance with some embodiments. Text 401 entered by the user may be displayed in the display tray 214. The text 401 may be entered by the user using the keyboard 210. An insertion marker 402 may be displayed in the display tray 214 to indicate the location where the next entered character will be inserted. In some embodiments, the insertion marker 402 is a vertical bar. In some other embodiments, the insertion marker 402 is a rectangular block, an underscore, a vertical bar with two crossbars at the top and bottom (an "I-bar" or "I-beam"), crosshairs, or a pointer arrow. The insertion marker 402 may be displayed with or without a blinking effect.

When a user of the device 200 makes contact with the touch screen with a finger 212 (not shown), the contact forms a contact area 404 (not drawn to scale) on the touch screen 208. As long as the contact with the touch screen 208 remains unbroken, the contact area 404 remains. It should be appreciated, however, that while the contact area 404 is illustrated as a regular shape in the Figures, that is not necessarily so. The contact area 404 may be a regular or irregular shape. Additionally, the shape of the contact area 404 may vary throughout the duration of the contact.

When the contact is detected, an insertion marker placement aid 406 is displayed in the display tray 214. The insertion marker placement aid 406 provides visual feedback to the user that the insertion marker 402 may be repositioned by the user. The insertion marker placement aid 406 also provides visual feedback to the user with respect to the current position of the insertion marker 402. This visual feedback facilitates movement of the insertion pointer by the user without the user placing his finger directly over the insertion marker 402, thereby allowing the user to see the insertion marker as it is moved to a position of the user's choosing.

Figure 4A:
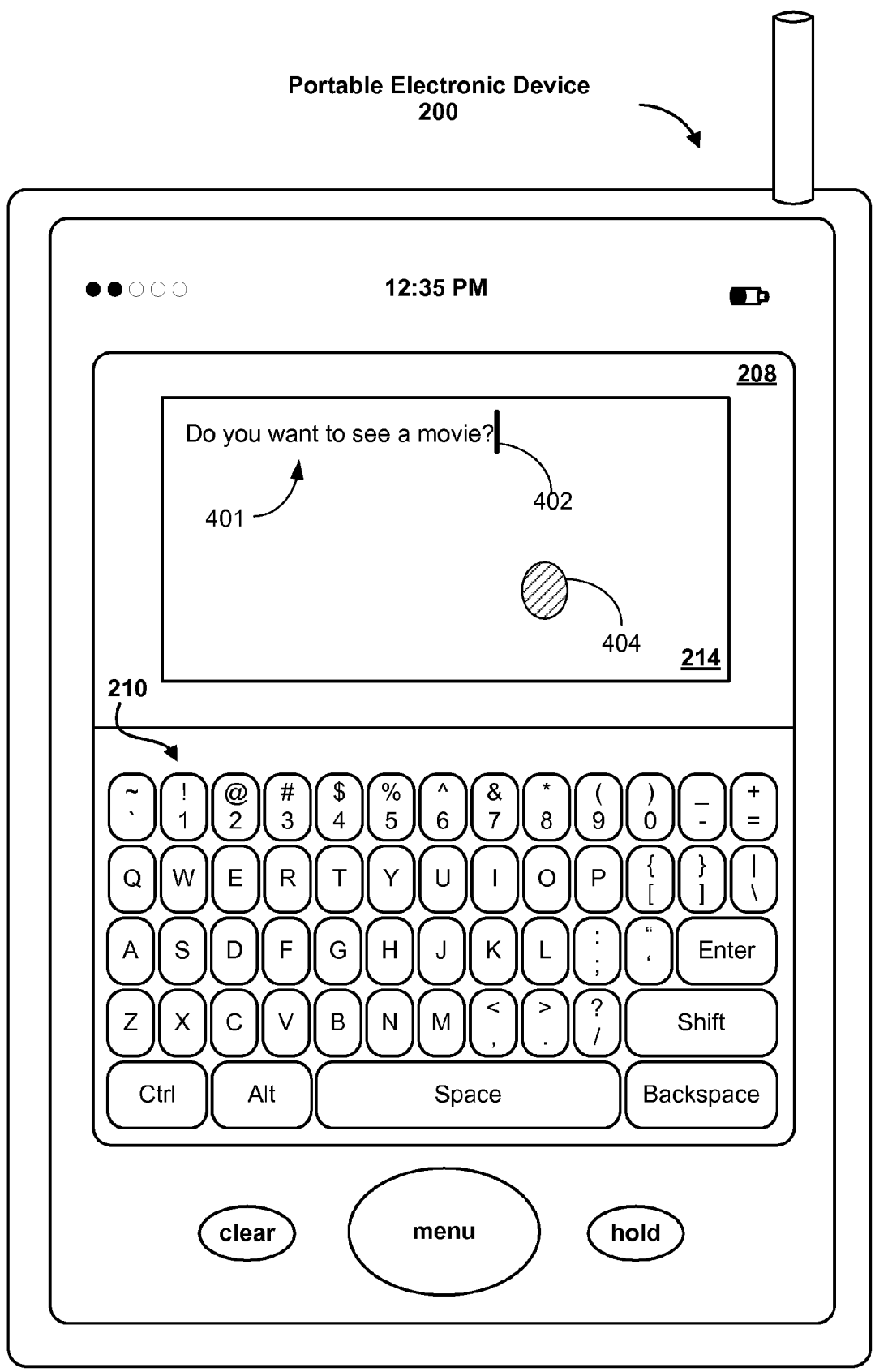
FIGS. 4A-4F illustrate a user interface for positioning an insertion marker via an insertion marker placement aid in accordance with some embodiments.
Figure 4B:
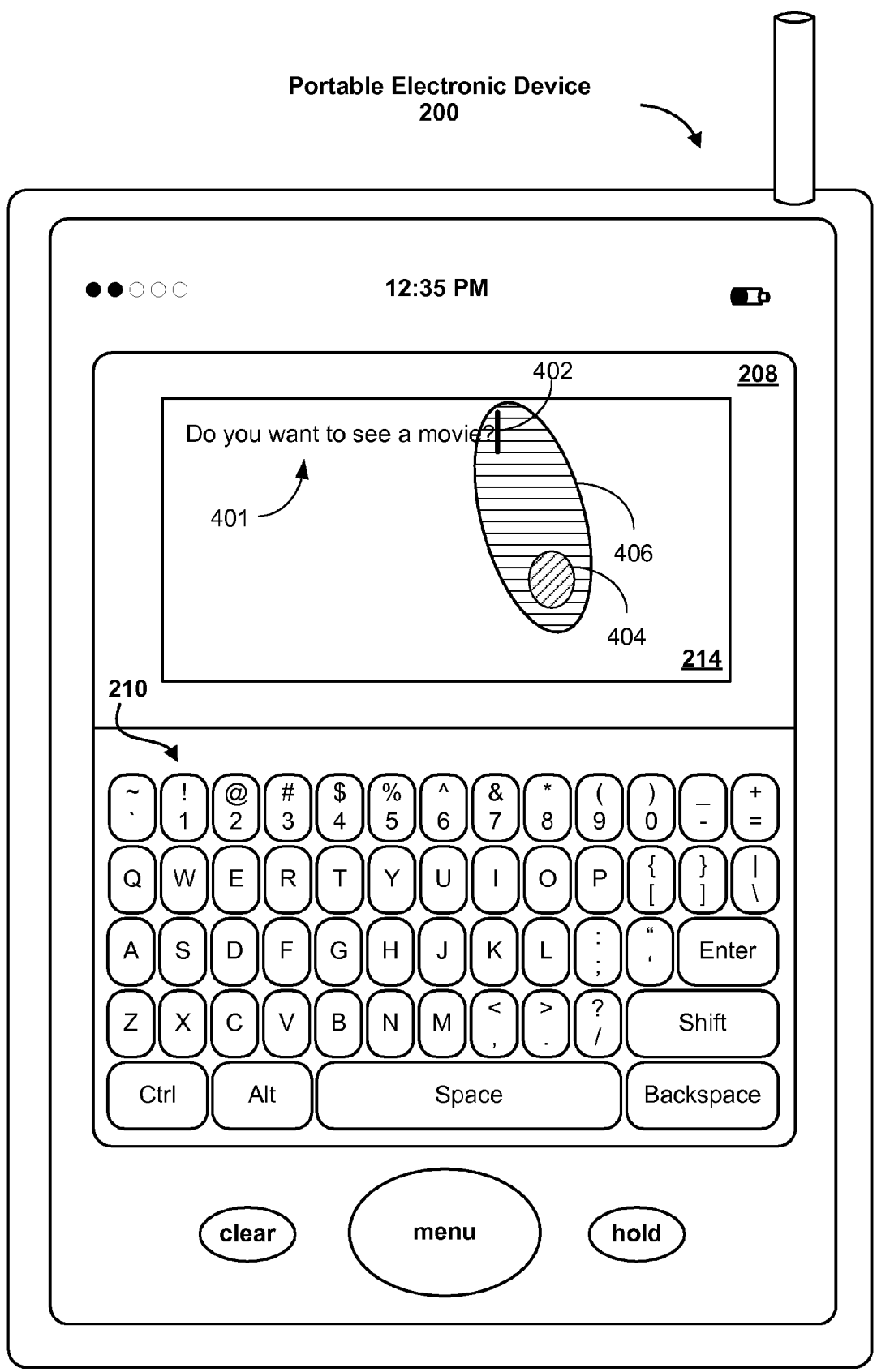
Figure 4C:
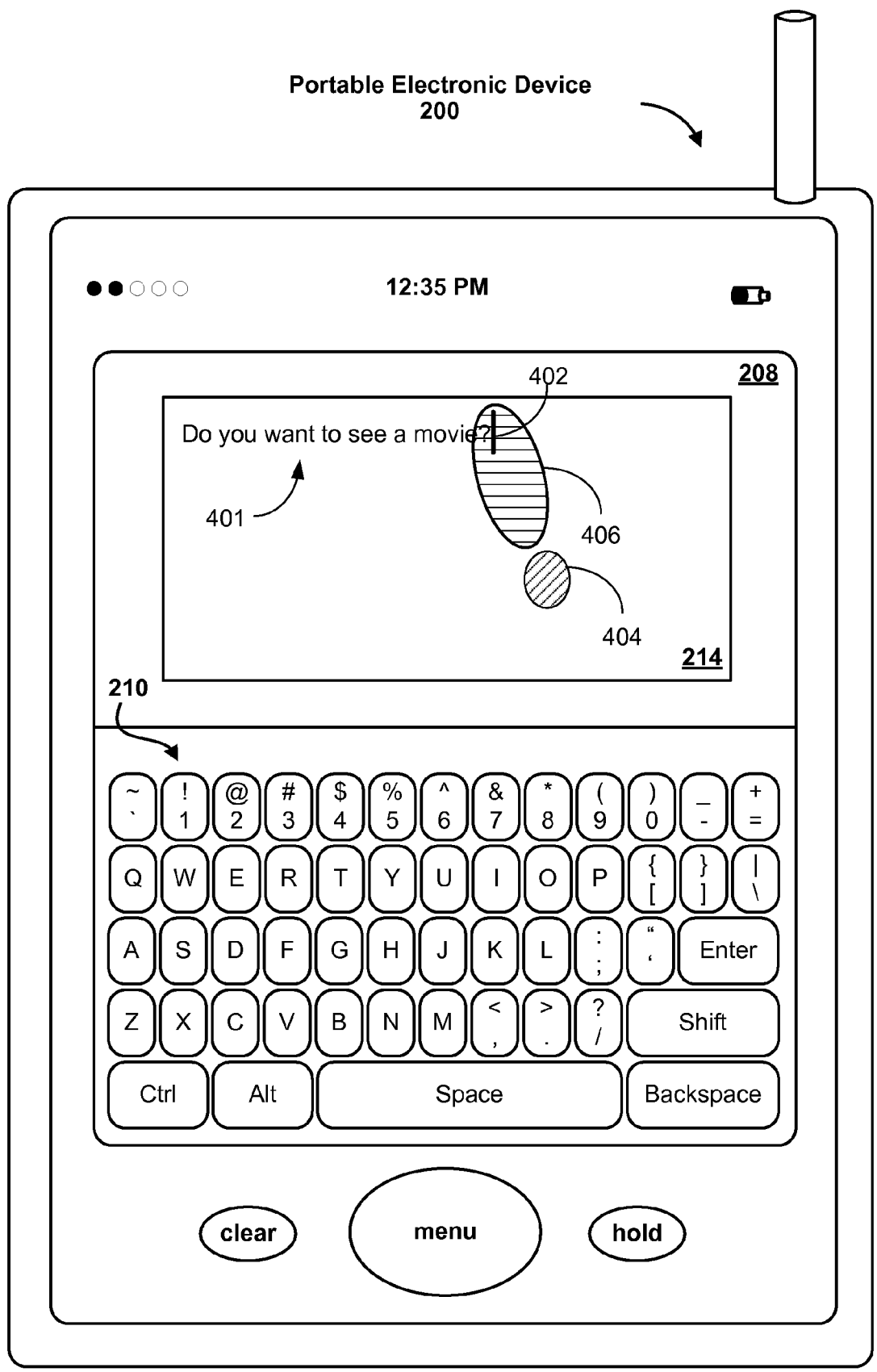
Figure 4D:
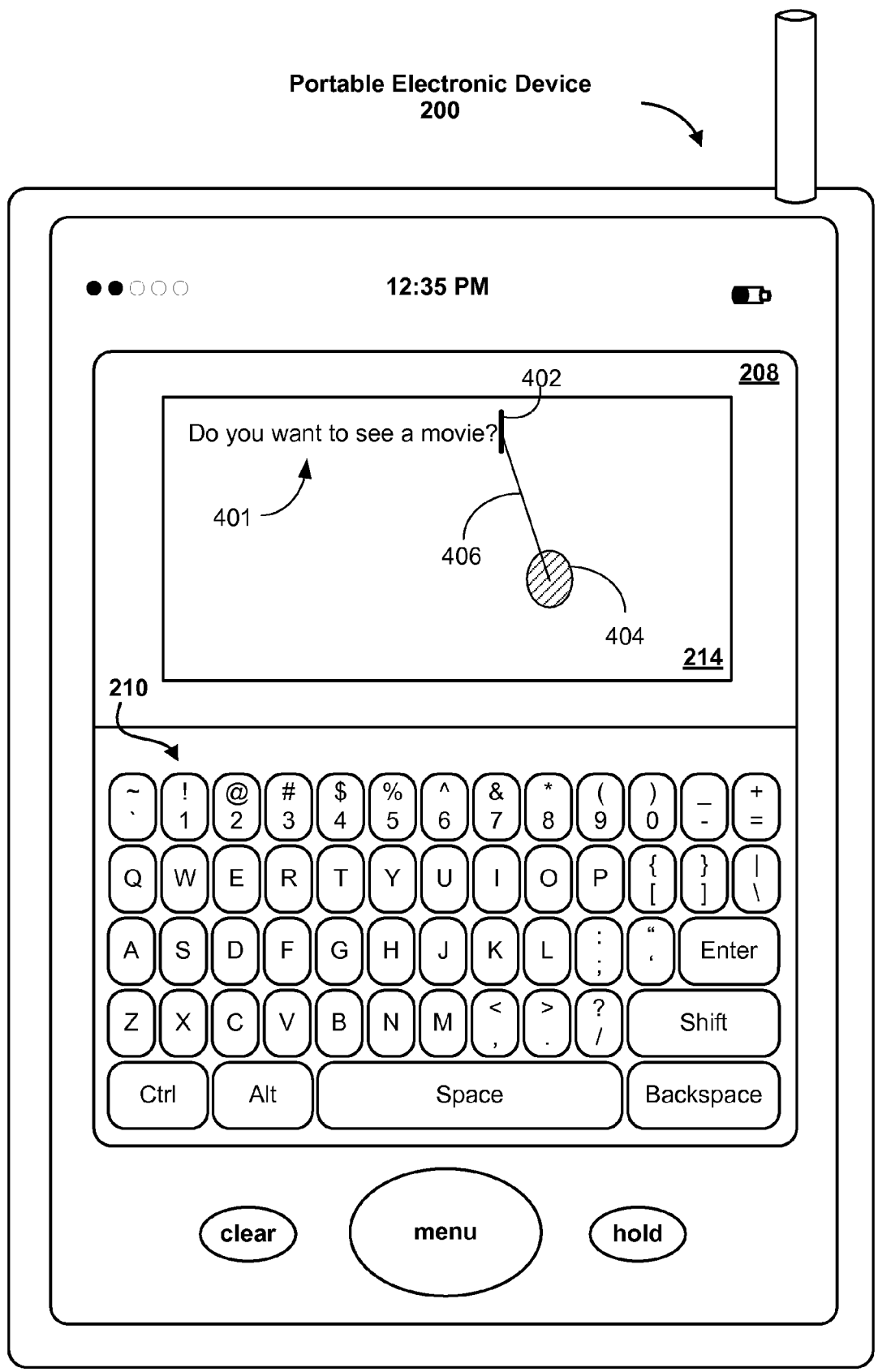
Figure 4E:
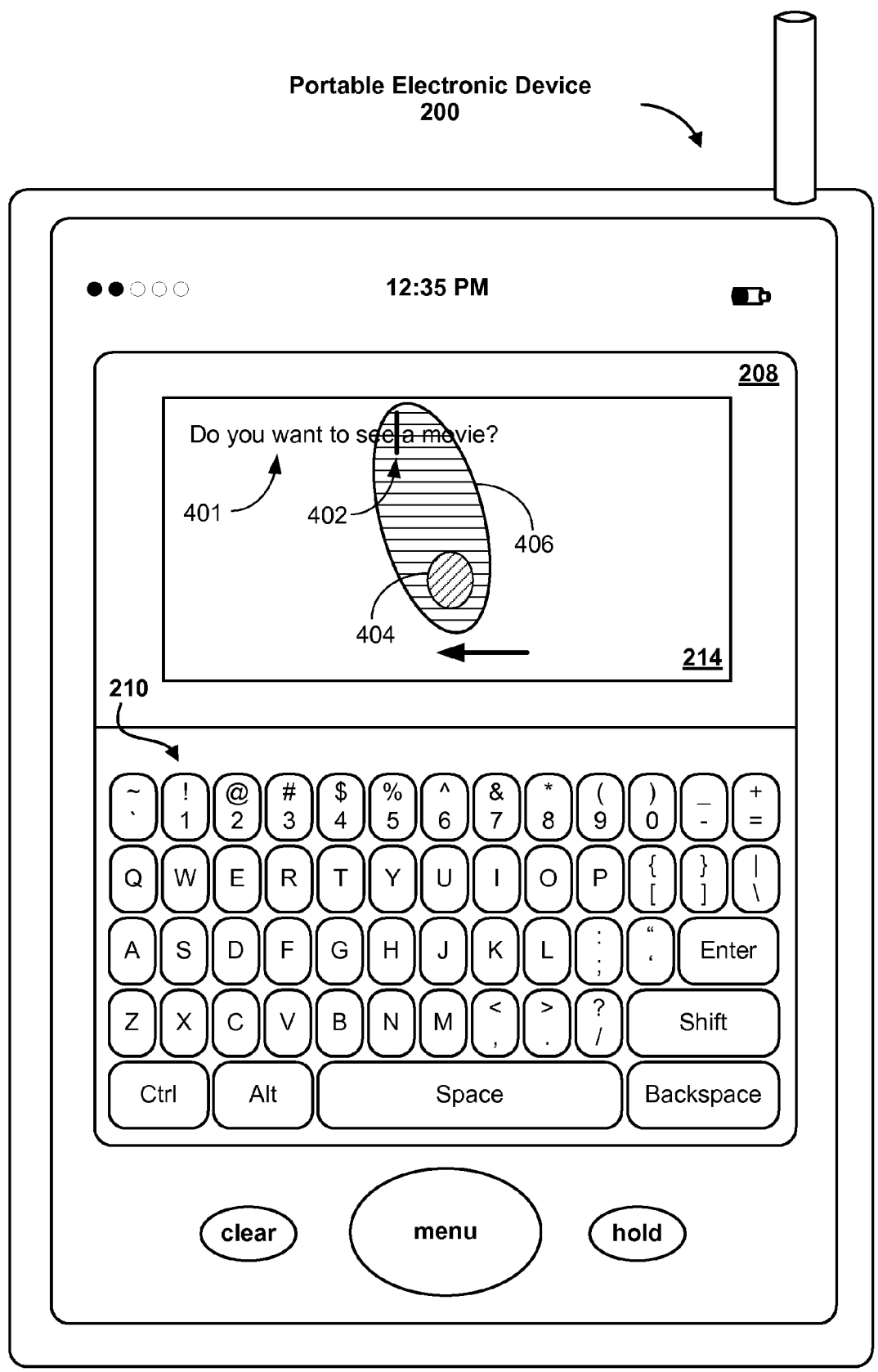

In some embodiments, the insertion marker placement aid 406 is an oval-shaped or some other bounded area that is displayed with a different color, shading and/or brightness (as indicated by the hatching in the interior area of the insertion marker placement aid 406, as shown in FIGS. 4B, 4C, and 4E) than the background of the display tray 214. In some other embodiments, the insertion marker placement aid 406 may be some other shape or object, such as a line connecting the insertion marker 402 and the contact area 404.

In some embodiments, the insertion marker placement aid 406 overlaps both the insertion marker 402 and the contact area 404, as shown in FIGS. 4B, 4D, 4E. In some other embodiments, the insertion marker placement aid 406 need not overlap either the insertion marker 402 or the contact area 404. For example, the insertion marker placement aid 406 may overlap either the insertion marker 402 or the contact area 404 but not both, as shown in FIG. 4C. More generally, the insertion marker placement aid may "overlap" the insertion marker and/or the contact area by intersecting or completely enclosing the insertion marker and/or the contact area, respectively. While in some embodiments the contact area 404 is visually displayed to the user, in other embodiments the contact area 404 is not visually displayed to the user. However, even when it is not explicitly or separately displayed, the contact area 404 is tracked by the device and is used to control the position and movement of the insertion marker 402 and the insertion marker placement aid 406.

Figure 4F:
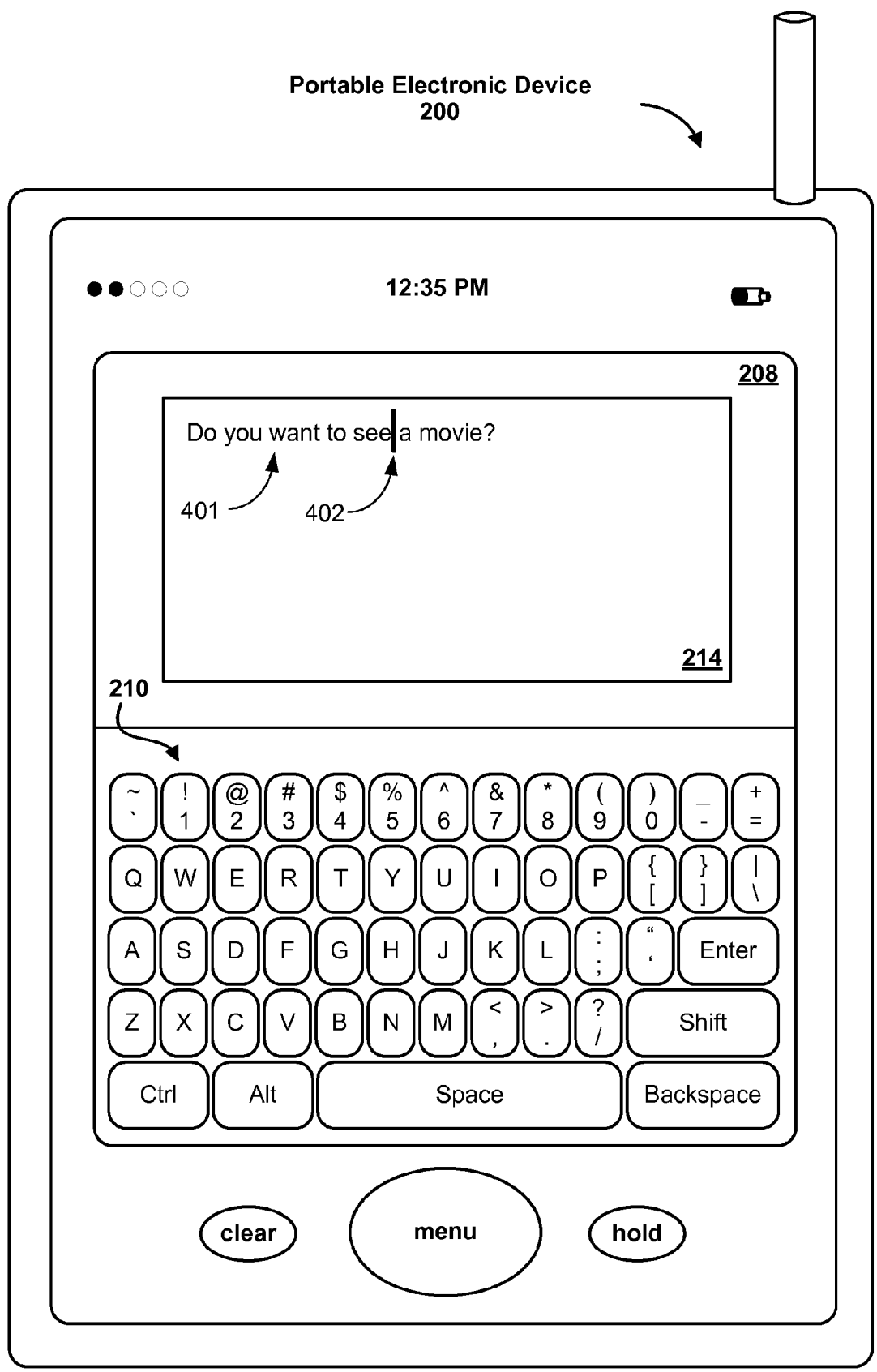

While the finger 212 is still in contact with the touch screen 208, the user may move the finger 212 across the touch screen 208, and thus moving the contact area 404 in the process. As shown in FIG. 4E, the insertion marker placement aid 406 and the insertion marker 402 move along with the contact area 404. The insertion marker 402, which was at the end of the text 401, is now at a position that is closer to the middle of the text 401. When the user removes the contact by lifting the finger 212 away from the touch screen 404, the contact area 404 and the insertion marker placement aid 406 is removed from display, and the insertion marker 402 comes to rest at its last position, as shown in FIG. 4F.

The embodiments described above enable a user of a portable device to easily move and position an insertion marker displayed on the touch screen without the aid of a precision instrument (such as a stylus). The user can make contact with the touch screen with a finger, away from the location of the insertion marker, without obscuring the insertion marker or content in the immediate vicinity of the insertion marker. An insertion marker placement aid is displayed to indicate to the user that the insertion marker is under the user's control and may be repositioned by the user. The user moves the finger contact, and the insertion marker and the insertion marker placement aid moves in accordance with the movement of the finger contact. Once the insertion marker is in the user's desired position, the user breaks the finger contact and the insertion marker is left in the desired position. In some instances, finger movements associated with breaking contact with the display result in a cursor position not intended by the user. To avoid this unintended result, in some embodiments, heuristic rules are used to determine the position of the insertion marker after the user breaks the finger contact. For example, the final position of the cursor may be made in accordance with the average location of the user's finger during a predetermined time interval just before contact with the display was broken. Alternatively, the final position of the cursor may ignore finger movements in a predetermined time interval before contact with the display was broken.

Figure 5A:
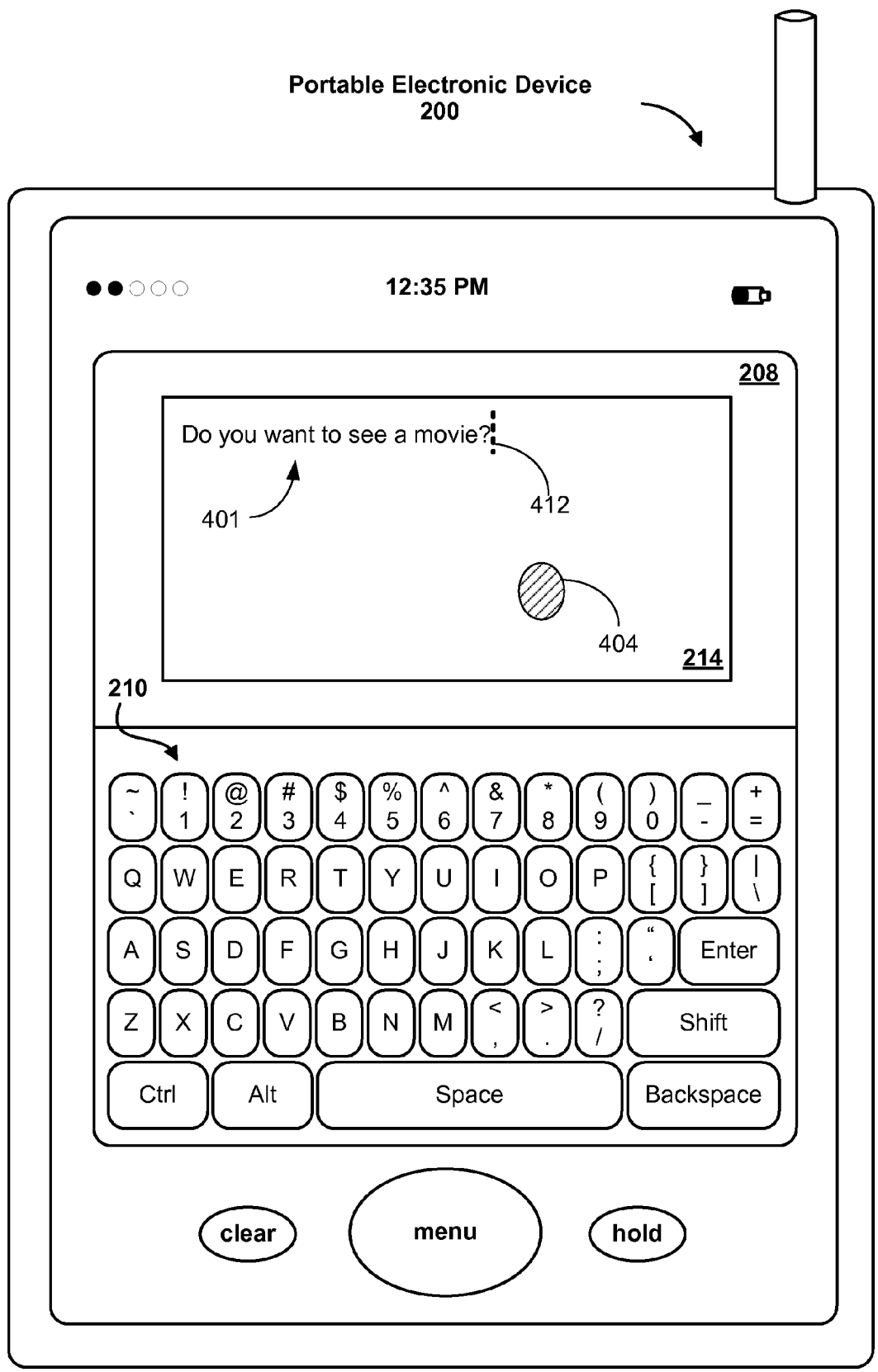
FIGS. 5A-5C illustrate an alternative user interface for positioning an insertion marker in accordance with some embodiments.
Figure 5B:
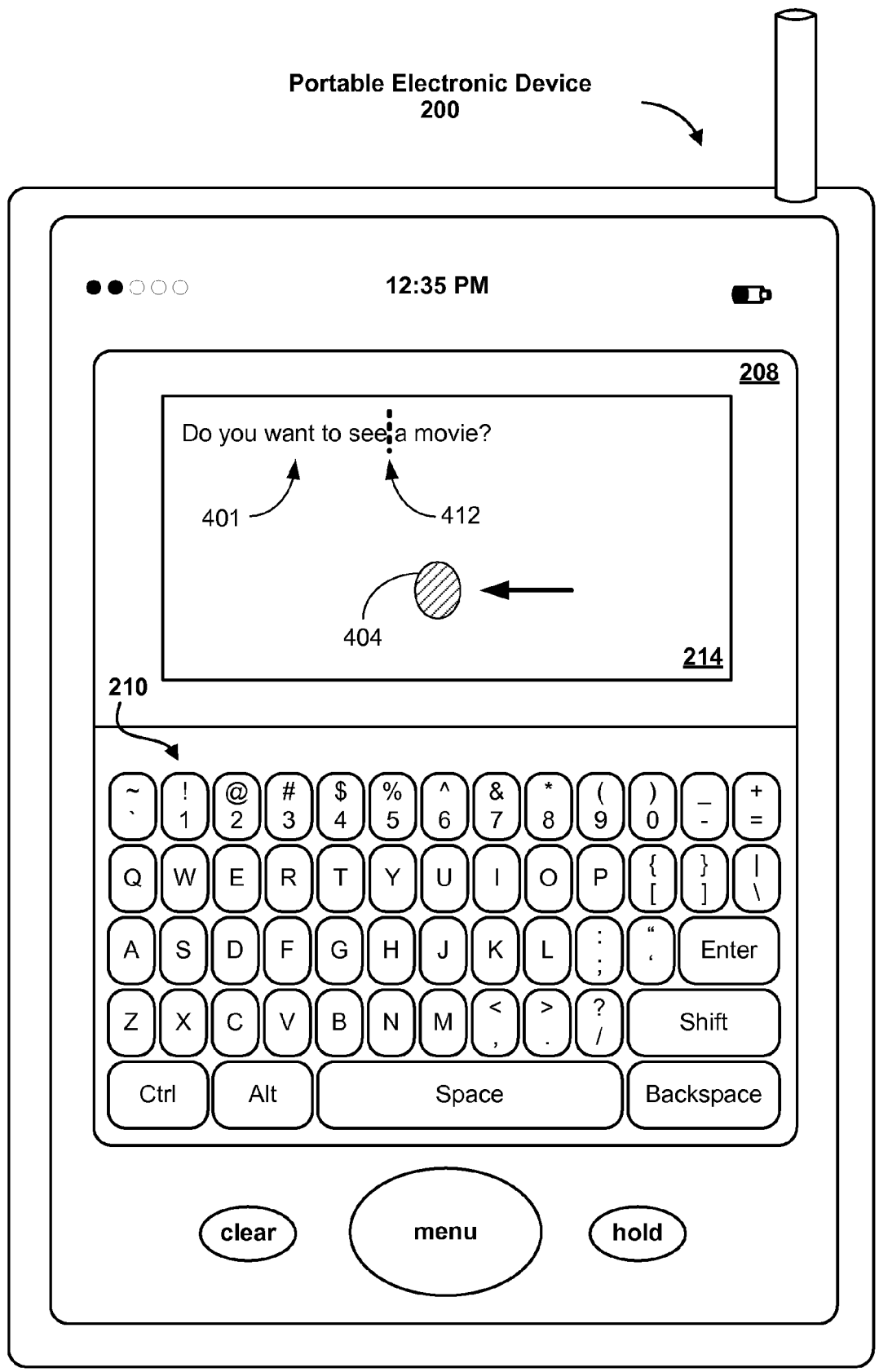
Figure 5C:
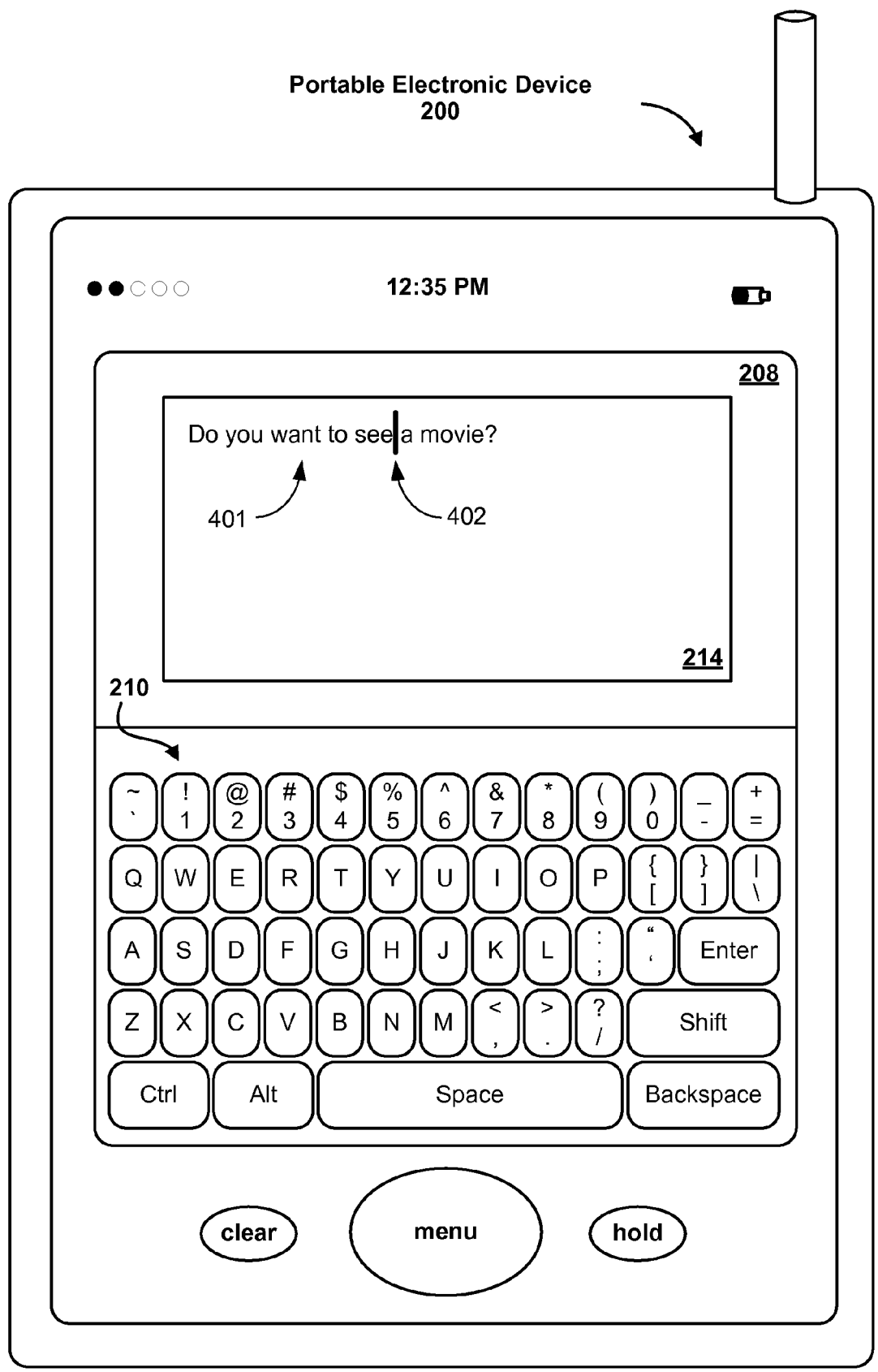

The embodiments described above provide visual feedback regarding control and position of the insertion marker to the user via an insertion marker placement aid. In some other embodiments, visual feedback may be provided without an insertion marker placement aid, as illustrated in FIGS. 5A-5C. Instead of displaying an insertion marker placement aid, the insertion marker 402 may be displayed with modifications when the user makes contact with the touch screen 208; the insertion marker is displayed as a modified insertion marker 412 (FIG. 5A). In some embodiments, the modified insertion marker 412 is displayed with a different color, brightness, pattern (e.g., dashed or patterned vs. solid) and/or size than the unmodified insertion marker 402.

The user may then move the contact area 404, moving the modified insertion marker 412 in the process, as shown in FIG. 5B. Once the modified insertion marker 412 is at the desired position, the user may break the contact, removing the contact area 404. After the break in contact, the modified insertion marker 412 reverts back to the normal insertion marker 402 (FIG. 5C); the display modifications from the unmodified insertion marker 402 to the modified insertion marker 412 are reversed. In other aspects, the modified insertion marker operates similarly to the insertion marker placement aid 406, described above. For example, the modified insertion marker may revert back to the normal insertion marker soon after the break of contact or after the elapse of a predetermined time after the break of contact.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising: at a portable electronic device with a touch screen display,
    displaying an insertion marker in a first area of the touch screen display that includes characters entered using a soft keyboard, wherein the soft keyboard is located in a second area of the touch screen display that is separate from the first area;
    detecting a finger contact within the first area of the touch screen display;
    in response to detecting the finger contact, displaying an insertion marker placement aid in the first area of the touch screen display;
    detecting movement of the finger contact across the touch screen display;
    moving the insertion marker and the insertion marker placement aid in accordance with the detected movement of the finger contact, wherein movement of the insertion marker and the insertion marker placement aid are confined to the first area of the touch screen display; and,
    in response to detecting movement of the finger contact from the first area into the second area:
        maintaining display of the insertion marker placement aid; and
        moving the insertion marker and the insertion marker placement aid in the first area in accordance with the detected movement of the finger contact in the second area.

2. The method of claim 1, wherein the insertion marker is a cursor, insertion bar, insertion point, or pointer.

3. The method of claim 1, wherein the location of the finger contact is separate from the location of the insertion marker.

4. The method of claim 3, wherein the insertion marker placement aid overlaps the location of the insertion marker.

5. The method of claim 3, wherein the insertion marker placement aid overlaps the location of the insertion marker and the location of the finger contact.

6. The method of claim 1, further comprising removing the insertion marker placement aid if finger contact with the touch screen display is broken.

7. The method of claim 6, wherein the removing includes fading out the insertion marker placement aid.

8. The method of claim 1, further comprising removing the insertion marker placement aid if finger contact with the touch screen display is no longer detected for a predetermined time.

9. A graphical user interface on a portable electronic device with a touch screen display, comprising:
- a soft keyboard located in a second area of the touch screen display that is separate from a first area;
- an insertion marker located in the first area of the touch screen display, the first area including characters entered using the soft keyboard; and
- an insertion marker placement aid located in the first area of the touch screen display,
- wherein the insertion marker and the insertion marker placement aid are confined to move in the first area of the touch screen display in accordance with detected movement of a finger that contacts the touch screen display; and,
- in response to detection of movement of the finger contact from the first area into the second area:
  - the insertion marker placement aid continues to be displayed; and
  - the insertion marker and the insertion marker placement aid are moved within in the first area in accordance with the detected movement of the finger contact in the second area.

10. The graphical user interface of claim 9, wherein the insertion marker is a cursor, insertion bar, insertion point, or pointer.

11. The graphical user interface of claim 9, wherein the location of the finger contact is separate from the location of the insertion marker.

12. The graphical user interface of claim 11, wherein the insertion marker placement aid overlaps the location of the insertion marker.

13. The graphical user interface of claim 11, wherein the insertion marker placement aid overlaps the location of the insertion marker and the location of the finger contact.

14. The graphical user interface of claim 9, wherein the insertion marker aid is removed in response to detecting that finger contact with the touch screen display is broken.

15. The graphical user interface of claim 14, wherein the removing includes fading out the insertion marker placement aid.

16. The graphical user interface of claim 9, wherein the insertion marker placement aid is removed if finger contact with the touch screen is no longer detected for a predetermined time.

17. A portable electronic device, comprising:
- a touch screen display;
- one or more processors;
- memory; and
- at least one program, wherein the at least one program is stored in the memory and configured to be executed by the one or more processors, the at least one program including:
- instructions for displaying an insertion marker in a first area of the touch screen display that includes characters entered using a soft keyboard, wherein the soft keyboard is located in a second area of the touch screen display that is separate from the first area;
- instructions for detecting a finger contact within the first area of the touch screen display;
- instructions for, in response to detecting the finger contact, displaying an insertion marker placement aid in the first area of the touch screen display;
- instructions for detecting movement of the finger contact;
- instructions for moving the insertion marker and the insertion marker placement aid in accordance with the detected movement of the finger contact, wherein movement of the insertion marker and the insertion marker placement aid are confined to the first area of the touch screen display; and
- instructions for, in response to detecting movement of the finger contact from the first area into the second area:
  - maintaining display of the insertion marker placement aid; and
  - moving the insertion marker and the insertion marker placement aid in the first area in accordance with the detected movement of the finger contact in the second area.

18. The portable electronic device of claim 17, wherein the insertion marker is a cursor, insertion bar, insertion point, or pointer.

19. The portable electronic device of claim 17, wherein the location of the finger contact is separate from the location of the insertion marker.

20. The portable electronic device of claim 19, wherein the insertion marker placement aid overlaps the location of the insertion marker.

21. The portable electronic device of claim 19, wherein the insertion marker placement aid overlaps the location of the insertion marker and the location of the finger contact.

22. The portable electronic device of claim 17, wherein the at least one program further includes instructions for removing the insertion marker placement aid if finger contact with the touch screen display is broken.

23. The portable electronic device of claim 22, wherein the removing includes fading out the insertion marker placement aid.

24. The portable electronic device of claim 17, wherein the at least one program further includes instructions for removing the insertion marker placement aid if finger contact with the touch screen display is no longer detected for a predetermined time.

25. A computer readable storage medium storing one or more programs, the one or more programs comprising instructions, which when executed by a portable electronic device with a touch screen display, cause the device to:
- display an insertion marker in a first area of the touch screen display that includes characters entered using a soft keyboard, wherein the soft keyboard is located in a second area of the touch screen display that is separate from the first area;
- detect a finger contact within the first area of the touch screen display;
- in response to detecting the finger contact, display an insertion marker placement aid in the first area of the touch screen display;
- detect movement of the finger contact;
- move the insertion marker and the insertion marker placement aid in accordance with the detected movement of the finger contact, wherein movement of the insertion marker and the insertion marker placement aid are confined to the first area of the touch screen display; and,
- in response to detecting movement of the finger contact from the first area into the second area:
  - maintain display of the insertion marker placement aid; and move the insertion marker and the insertion marker placement aid in the first area in accordance with the detected movement of the finger contact in the second area.

26. The computer readable storage medium of claim 25, wherein the insertion marker is a cursor, insertion bar, insertion point, or pointer.

27. The computer readable storage medium of claim 25, wherein the location of the finger contact is separate from the location of the insertion marker.

28. The computer readable storage medium of claim 27, wherein the insertion marker placement aid overlaps the location of the insertion marker.

29. The computer readable storage medium of claim 27, wherein the insertion marker placement aid overlaps the location of the insertion marker and the location of the finger contact.

30. The computer readable storage medium of claim 25, further comprising remove the insertion marker placement aid if finger contact with the touch screen display is broken.

31. The computer readable storage medium of claim 30, wherein the removing includes fading out the insertion marker placement aid.

32. The computer readable storage medium of claim 25, further comprising remove the insertion marker placement aid if finger contact with the touch screen display is no longer detected for a predetermined time.

33. A portable electronic device with a touch screen display, comprising:
 means for displaying an insertion marker in a first area of the touch screen display that includes characters entered using a soft keyboard, wherein the soft keyboard is located in a second area of the touch screen display that is separate from the first area;
 means for detecting a finger contact within the first area of the touch screen display;
 in response to detecting the finger contact, means for displaying an insertion marker placement aid in the first area of the touch screen display;
 means for detecting movement of the finger contact;
 means for moving the insertion marker and the insertion marker placement aid in accordance with the detected movement of the finger contact, wherein movement of the insertion marker and the insertion marker placement aid are confined to the first area of the touch screen display; and
 in response to detecting movement of the finger contact from the first area into the second area:
  means for maintaining display of the insertion marker placement aid; and
  means for moving the insertion marker and the insertion marker placement aid in the first area in accordance with the detected movement of the finger contact in the second area.

* * * * *

UNITED STATES PATENT AND TRADEMARK OFFICE
CERTIFICATE OF CORRECTION

| | | |
|---|---|---|
| PATENT NO. | : 7,856,605 B2 | Page 1 of 1 |
| APPLICATION NO. | : 11/553436 | |
| DATED | : December 21, 2010 | |
| INVENTOR(S) | : Bas Ording et al. | |

It is certified that error appears in the above-identified patent and that said Letters Patent is hereby corrected as shown below:

In column 7, line 29, delete "FIG. The" and insert -- FIG. 2. The --, therefor.

Signed and Sealed this
First Day of November, 2011

David J. Kappos
*Director of the United States Patent and Trademark Office*